United States Patent [19]

Mosley et al.

[11] Patent Number: 4,484,335
[45] Date of Patent: Nov. 20, 1984

[54] METHOD AND APPARATUS FOR DESPREADING A SPREAD SPECTRUM SIGNAL AT BASEBAND

[75] Inventors: William H. Mosley; David E. Sanders, both of St. Petersburg, Fla.

[73] Assignee: E-Systems, Inc., Dallas, Tex.

[21] Appl. No.: 434,530

[22] Filed: Oct. 14, 1982

[51] Int. Cl.³ .............................................. H03D 1/24
[52] U.S. Cl. ....................................... 375/1; 329/104; 375/96
[58] Field of Search .................. 343/5 PN; 375/1, 39, 375/96, 77, 97; 364/604, 728, 819; 329/104, 112, 110

[56] References Cited

U.S. PATENT DOCUMENTS

| | | | |
|---|---|---|---|
| 4,119,926 | 10/1978 | Frosch | 375/1 |
| 4,203,071 | 5/1980 | Bowles et al. | 375/1 |
| 4,241,347 | 12/1980 | Albanese et al. | 343/5 PN |

Primary Examiner—Benedict V. Safourek
Attorney, Agent, or Firm—Albert M. Crowder, Jr.

[57] ABSTRACT

A baseband correlation circuit (10) receives an IF spread spectrum input signal which is phase compared with a local oscillator signal and a phase shifted local oscillator signal to produce I channel and Q channel spread baseband signals. Each of these signals is input to four sample and hold circuits (34–48). A local PN code signal is converted from two-phase to four-phase to produce I and Q channel local PN signals. These signals together with the logical inverses thereof are provided as the control inputs for the sample and hold circuits (34–48). For each pair of sample and hold circuits there is a respective summer (86–92). The pair of sample and hold circuits together with the corresponding summer comprises a double balanced multiplier. There are four double balanced multipliers for producing four respective product signals. The product signals are input as pairs into summers (106) and (108) to produce despread, narrowband baseband I and Q channel output signals at output lines (110, 112). The baseband correlator circuit (10) of the present invention serves to despread the spread spectrum IF signal at baseband, thereby eliminating the need for costly and bulky components which are required for despreading at RF frequencies.

8 Claims, 3 Drawing Figures

METHOD AND APPARATUS FOR DESPREADING A SPREAD SPECTRUM SIGNAL AT BASEBAND

TECHNICAL FIELD

The present invention pertains to electronic communications in general and more particularly to the demodulation of spread spectrum communication signals.

BACKGROUND OF THE INVENTION

Spread spectrum communication primarily serves two purposes, the first is to make the transmitted signal hard to detect by unauthorized receivers and the second is to prevent the communications from being jammed. The transmitted signal is normally spread by phase modulating a desired narrowband signal by use of a pseudonoise (PN) code sequence. At the receiver, the spread signal must be despread by correlating the spread signal with a local PN code which has the same pattern as the transmitted PN code. The despreading reconstructs the original narrowband signal to complete the communication channel.

Spread spectrum signals are typically despread (correlated) at some RF frequency. This technique, however, is relatively expensive and complex due to the need for costly quadraphase correlators and a large number of RF components such as 90° hybrids, transformers, mixers, inductors, etc. Each of these items adds substantial bulk, as well as cost, to the building of a spread spectrum communicaton system.

In view of the above problems related to spread spectrum communications, there exists a need for a method and apparatus for despreading (correlating) a receive signal at baseband for eliminating the need for expensive and bulky hybrids, transformers, inductors, etc.

BRIEF DESCRIPTION OF THE INVENTION

A selected embodiment of the present invention comprises a baseband correlator circuit for despreading a spread spectrum signal. The correlator includes circuit means for translating the spread spectrum signal to baseband as I (in-phase) and Q (quadrature) channel baseband signals, said spread spectrum signal utilizing a pseudonoise (PN) code sequence. Circuit means are provided for converting a PN signal, comprising said PN code sequence, into four-phase signals comprising an in-phase PN signal and a quadrature phase PN signal. Further circuit means are provided for multiplying each of the I and Q channels baseband signals by each of said PN signals to produce first, second, third and fourth product signals. Summation means are provided for summing the first and second product signals to produce a despread I channel output signal. Further summation means are provided for summing the third and fourth product signals to produce a despread Q channel output signal.

BRIEF DESCRIPTION OF THE DRAWINGS

For a more complete understanding of the present invention and the advantages thereof, reference is now made to the following Description taken in conjunction with the accompanying drawings in which.

DETAILED DESCRIPTION OF THE INVENTION

Figure 1:
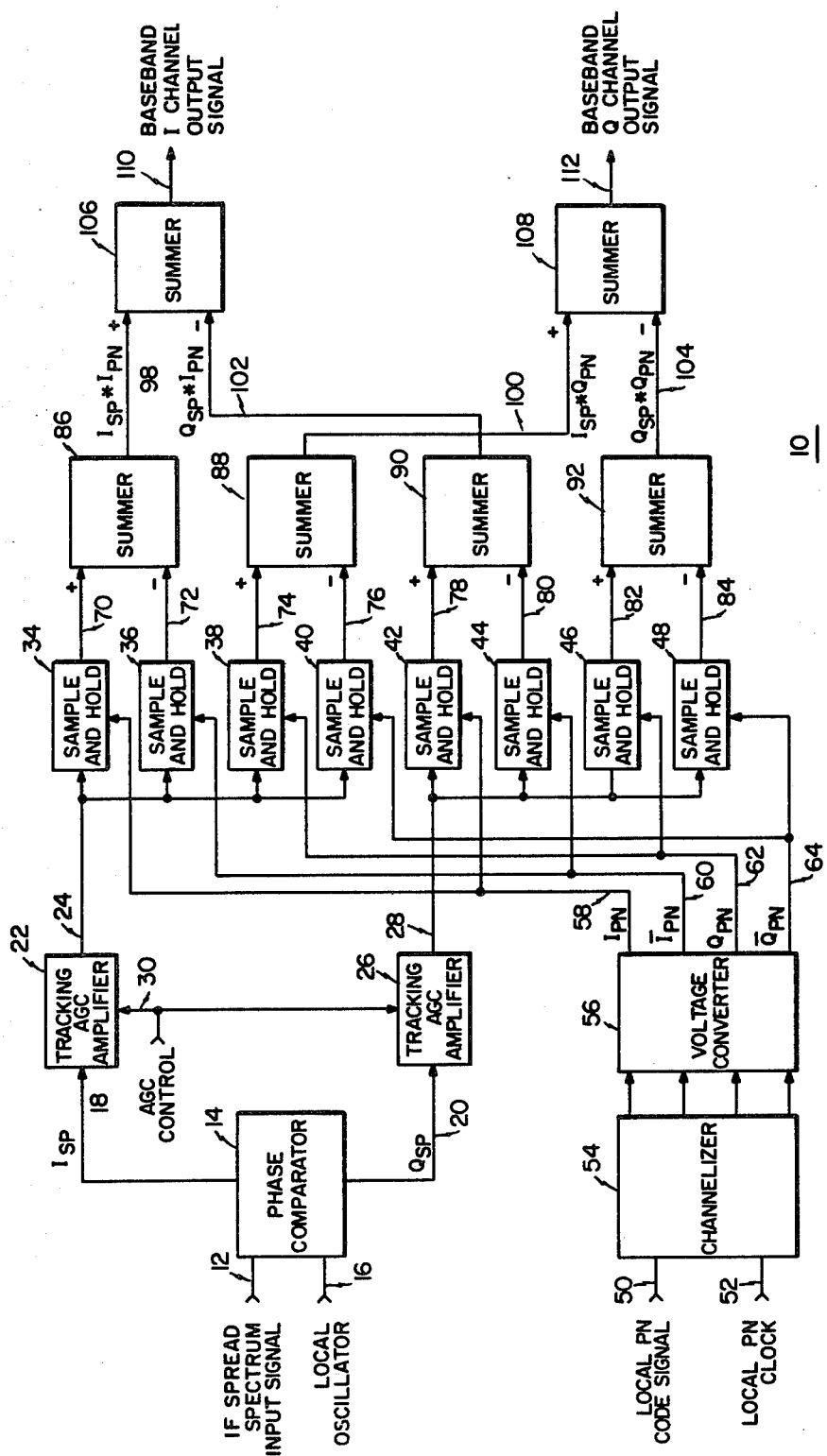
FIG. 1 is a block diagram of a baseband correlating circuit in accordance with the present invention.

A block diagram of a baseband correlator circuit for despreading a spread spectrum IF signal is illustrated in FIG. 1 and is designatated generallly by the reference 10. The circuit 10 receives an IF spread spectrum input signal through a line 12 to a phase comparator 14. A local oscillator signal is input through a line 16 to the phase comparator 14. The spread IF input signal is phase compared (mixed) with the local oscillator signal to produce a difference I channel (in-phase) spread baseband signal designated $I_{SP}$ at a line 18. The phase comparator 14 also produces a 90° phase offset local oscillator signal which is phase compared to the spread IF input signal to produce a difference Q channel (quadrature phase) spread baseband signal, designated as $Q_{SP}$ at a line 20. This type of phase comparator is a model FP8-PC-300 manufactured by Olektron Corp.

The signal $I_{SP}$ is passed through a tracking AGC amplifier 22 to a line 24. The signal $Q_{SP}$ is passed through a tracking AGC amplifier 26 to a line 28. An AGC control signal is input through a line 30 to regulate the amplitude of the signals at lines 24 and 28. The AGC control signal is produced by an amplitude monitor (not shown) which monitors the amplitude of the baseband I and Q channel signals produced by circuit 10. The amplifiers 22 and 26 are matched for tracking such that the signals $I_{SP}$ and $Q_{SP}$ at lines 24 and 28 phase and amplitude are balanced.

The circuit 10 includes a group of eight sample and hold circuits which are labeled 34, 36, 38, 40, 42, 44, 46 and 48. The $I_{SP}$ signal at line 24 is provided as an input to each of the sample and hold circuits 34, 36, 38 and 40. The $Q_{SP}$ signal at line 28 is provided as an input to the sample and hold circuits 42, 44, 46 and 48.

The circuit 10 further receives as an input a local PN code signal at a line 50. The PN code within this signal is the same as that in the IF spread spectrum input signal which is received through line 12. A local PN clock signal is passed through a line 52 to provide the clocking sequence for the local PN code signal at line 50. Both the local PN code signal passed through line 50 and the local PN clock signal passed through line 52 are input to a channelizer 54 which functions as a two-phase to four-phase converter for a local PN code signal. The channelizer 54 is described in further detail in FIG. 2. Four signals are produced by the channelizer 54 and these are passed through a voltage converter 56 which converts the voltage levels at the output of channelizer 54 into suitable levels for driving the sample and hold circuits 34–48. The four signals produced at the output of the voltage converter 56 are transmitted through lines 58, 60, 62 and 64. An in-phase PN signal $I_{PN}$ is produced at line 58. The logical inverse of the in-phase PN signal, $\overline{I}_{PN}$, is produced at line 60. A quadrature phase PN signal $Q_{PN}$ is produced at line 62. The logical inverse of the quadrature phase PN signal, $\overline{Q}_{PN}$, is produced at line 64.

The signal $I_{PN}$ at line 58 is provided to the control inputs of sample and hold circuits 34 and 42. The signal $\overline{I}_{PN}$ at line 60 is provided to the control inputs of sample and hold cicuits 36 and 44. The signal $Q_{PN}$ at line 62 is provided to the control inputs of sample and hold circuits 38 and 46. The signal $\overline{Q}_{PN}$ at line 64 is provided to the control inputs of sample and hold circuits 40 and 48.

The outputs of sample and hold circuits 34–48 are transmitted respectively through lines 70, 72, 74, 76, 78, 80, 82 and 84. Lines 70 and 72 provide inputs to a summer 86. The output of sample and hold circuit 36 is a negative input to the summer 86. The lines 74 and 76 provide inputs to a summer 88. The output of sample and hold circuit 40 is a negative input to the summer 88. Lines 78 and 80 provide inputs to a summer 90. The output of sample and hold cicuit 44 is a negative input to the summer 90. Lines 82 and 84 provide inputs to a summer 92. The output of sample and hold circuit 48 provides a negative input to the summer 92.

The combination of the sample and hold circuits 4 and 36 together with the summer 86 comprises a first double balanced multiplier which produces a first product signal shown as $I_{SP}* I_{PN}$ at line 98. The sample and hold circuts 38 and 40 together with the summer 88 comprise a second double balanced multiplier which produces a second product signal designated as $I_{SP}* Q_{PN}$ at line 100. The sample and hold circuts 42 and 44 together with the summer 90 comprise a third double balanced multiplier which produces a third product signal designated as $Q_{SP}* I_{PN}$ at line 102. The combination of sample and hold circuits 46 and 48 together with the summer 92 comprise a fourth double balanced multiplier for producing a fourth product signal designated as $Q_{SP}* Q_{PN}$ at a line 104.

The lines 98 and 102 provide inputs to a summer 106 with the line 102 comprising a negative input. The lines 100 and 104 provide inputs to a summer 108 with the line 104 comprising a negative input.

The summer 106 receives the product signals from summers 86 and 90 and produces therefrom a baseband I channel output signal at a line 110. The summer 108 receives the product signals from summers 88 an 92 and produces therefrom a baseband Q channel output signal at a line 112. The baseband I and Q channel output signals are despread. The PN code has been removed from these signals and the original data information reproduced.

Operation of the baseband correlator circuit 10 is now described in reference to FIG. 1. The purpose of circuit 10 is to despread the IF spread spectrum input signal provided at line 12. A spread spectrum signal is sequentially modulated with a PN code sequence to increase the bandwidth of the transmitted signal, thereby reducing the signal energy density. This in turn reduces the probability that the signal will be detected by third parties while reducing the effect of jamming interference.

The spread IF signal is frequency translated to baseband by phase comparison with the local oscillator signal. The IF signal is also phase compared with a phase shifted local oscillator signal. These phase comparisons produce the spread baseband signals $I_{SP}$ and $Q_{SP}$. These signals are in turn passed through amplifiers 22 and 26 such that the amplitudes and phase shifts of the spread baseband signals are maintained essentially equal.

The channelizer 54 converts the two-phase local PN code signal at line 50 into four-phase signals at lines 58–64. These signals are utilized to drive the sample and hold circuts 34–48. Each of the double balanced multipliers described above serves to multiply one of the spread baseband signals by one of the four-phase PN signals to produce a product signal. The output of each of the sample and hold circuits is a narrowband baseband signal. The summing process at the summers 86–92 is necessary to recover all the signal energy and to restore frequency and phase information for the received signal. The sample and hold circuits further serve as low pass filters to attenuate out-of-band jammer components which were created by the spreading of the jammer during the despreading process for the input signal. The low pass filtering action of the sample and hold circuits also serves to attenuate noise outside of the narrowband signal bandwidth.

The summing action of the summers 106 and 108 serves to complete the reproduction of the narrowband output signal comprising the baseband I channel output signal and the baseband Q channel output signal.

Figure 2:
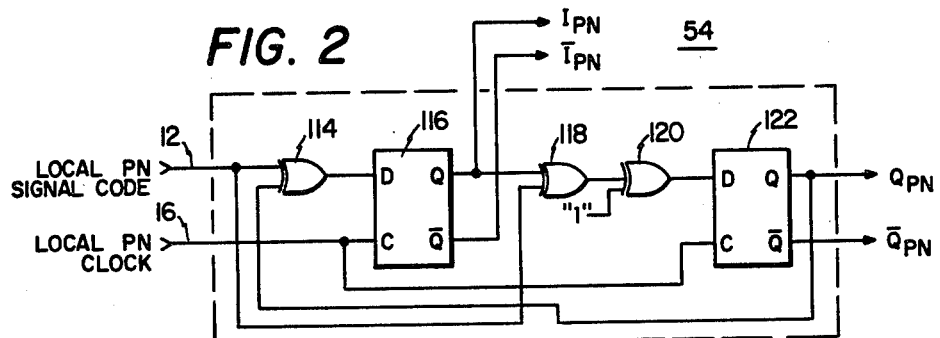
FIG. 2 is a schematic illustration of a channelizer circuit as shown in FIG. 1.

The channelizer 54 is shown as a schematic illustration in FIG. 2. The local PN code signal is input through line 12 to a first input of an exclusive OR gate 114. The output of gate 114 is provided to the D input of a flip-flop 116. The local PN clock signal at line 16 is input to the clock input of flip-flop 116. The $I_{PN}$ signal is produced at the Q output of flip-flop 116 and the $\overline{I}_{PN}$ signal is produced at the $\overline{Q}$ output of flip-flop 116.

The Q output of flip-flop 116 is provided to a first input of an exclusive OR gate 118. The local PN code signal at line 12 is provided to the second input of gate 118. The output from gate 118 is passed through an exclusive OR gate 120 which functions as an inverter.

The output of gate 120 is provided the D input of a flip-flop 122. The local PN clock signal at line 16 is also provided to the clock input of flip-flop 122. The Q output of flip-flop 122 provides the second input to the gate 114. The $Q_{PN}$ signal is produced at the Q output of flip-flop 122 an the $\overline{Q}_{PN}$ is produced at the $\overline{Q}$ output of flip-flop 122. The channelizer circuit 54 basically serves as a two-phase to four-phase converter.

Figure 3:
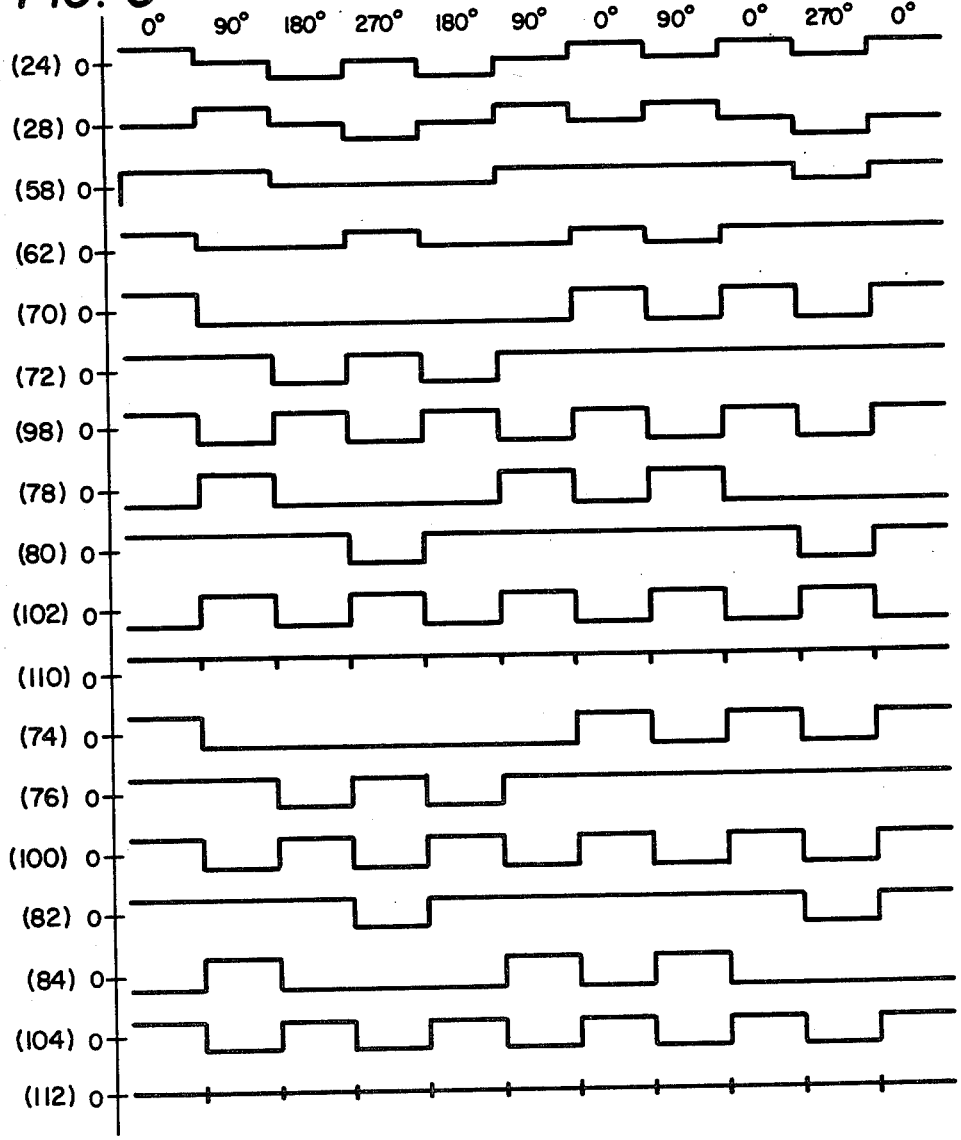
FIG. 3 is a collection of waveforms illustrating signals which appear in the circuits shown in FIGS. 1 and 2.

Referring now to FIG. 3 there are illustrated various waveforms which occur in the circuit 10 shown in FIG. 1. Each of the waveforms is labeled with a line number showing the location of the signal waveform. The phase angles shown at the top of FIG. 3 apply to the signals at lines 24 and 28 at the outputs of the amplifiers 22 and 26. This illustrates the phase for the PN code. For the waveform illustrated in FIG. 3 there is transmitted only the PN sequence in the I channel with no energy transmitted in the Q channel. This results in a high level output for the I channel output signal at line 110 and a low level output for the Q channel output at line 112.

In summary, the present invention comprises a method and apparatus for despreading a spread spectrum signal at baseband to simplify and reduce the expense of the despreading circuitry while enhancing the performance of a spread spectrum system.

Although one embodiment of the invention has been illustrated in the accompanying drawings and described in the foregoing detailed description, it will be understood that the invention is not limited to the embodiment disclosed, but is capable of numerous rearrangements, modification and substitutions without departing from the scope of the invention.

We claim:

1. A baseband correlator circuit for despreading a spread spectrum signal, comprising;
    means for translating said spread spectrum signal to baseband to produce an I (in-phase) channel baseband signal and a Q (quadrature) channel baseband signal, said spread spectrum signal utilizing a pseudonoise (PN) code sequence, means for converting a two-phase local PN signal comprising said PN code sequence into four-phase signals comprising two in-phase PN signals and two quadrature phase PN signals, means comprising four double balanced multipliers for multiplying said I and Q channel baseband signals by each of said four PN signals to produce first, second, third and fourth product signals, means for summing said first and second product signals to produce a despread I channel output signal, and means for summing said third and fourth product signals to produce a despread Q channel output signal.

2. A baseband correlator circuit as recited in claim 1 wherein said means for converting produces the logical inverse signals of said in-phase PN signal and said quadrature phase PN signal.

3. A baseband correlator circuit for despreading a spread IF signal, comprising:

a phase comparator connected to receive said spread IF signal having a pseudonoise (PN) code and a local oscillator signal for producing an I channel (in-phase) spread baseband signal and a Q channel (quadrature phase) spread baseband signal, means for converting a two-phase local PN signal, having said PN code therein, into four-phase signals comprising two in-phase PN signals and two quadrature phase PN signals, a first double balanced multiplier having said I channel spread baseband signal and said in-phase PN signals input thereto and producing a first product signal, a second double balanced multiplier having said I channel spread baseband signal and said quadrature phase PN signals input thereto and producing a second product signal, a third double balanced multiplier having said Q channel spread baseband signal and said in-phase PN signals input thereto and producing a third product signal, a fourth double balanced multiplier having said Q channel spread baseband signal and said quadrature phase PN signals input thereto and producing a fourth product signal, a first summation circuit connected to receive said first product signal and said third product signal for producing a despread, baseband I channel output signal, and a second summation circuit connected to receive said second product signal and said fourth product signal for producing a despread, baseband Q channel output signal.

4. A circuit as recited in claim 3 wherein each of said double balanced multipliers comprises:

first and second sample and hold circuits having one of said spread baseband signals input thereto and having the true and logical inverse of one of said PN signals provided respectively to the control inputs thereof, and a summation circuit connected to receive the outputs of said first and second sample and hold circuits for producing one of said product signals.

5. A method for despreading a spread spectrum signal, comprising the steps of:

translating said spread spectrum signal to baseband to produce an I (in-phase) channel baseband signal and a Q (quadrature) channel baseband signal, said spread spectrum signal utilizing a pseudonoise (PN) code sequence, converting a local two-phase PN signal comprising said PN code sequence into four-phase signals comprising two in-phase PN signals and two quadrature phase PN signals, multiplying in four double balanced multipliers each of said I and Q channel baseband signals by each of said PN signals to produce first, second, third and fourth product signals, summing said first and second product signals to produce a despread I channel output signal, and summing said third and fourth product signals to produce a despread Q channel output signal.

6. A method for despreading a spread spectrum signal as recited in claim 5 wherein the step of converting includes producing the logical inverse signals for said in-phase PN signal and said quadrature phase PN signal.

7. A method for despreading a spread IF signal having a pseudonoise (PN) code, comprising the steps of:

comparing said spread IF signal with a local oscillator signal to produce an I channel (in-phase) spread baseband signal and a Q channel (quadrature phase) spread baseband signal, converting a two-phase local PN signal having said PN code therein, into four-phase signals comprising two in-phase PN signals and two quadrature phase PN signals, double balance multiplying said I channel spread baseband signal and said in-phase PN signals to produce a first product signal, double balance multiplying said I channel spread baseband signal and said quadrature phase PN signal to produce second product signals, double balance multiplying said Q channel spread baseband signal and said in-phase PN signal to produce third product signals, double balance multiplying said Q channel spread baseband signal and said quadrature phase PN signal to produce fourth product signals, summing said first product signal and said third product signal to produce a despread, baseband I channel output signal, and summing said second product signal and said fourth product signal to produce a despread, baseband Q channel output signal.

8. A method as recited in claim 7 wherein each of the steps of double balance multiplying comprises:

sample and holding one of said spread baseband signals in response to one of said PN signal and the logical inverse of the one PN signal to produce first and second outputs, and summing said first and second outputs to produce one of said product signals.

* * * * *